Dec. 3, 1968    M. H. DAVIS    3,414,099
TILT MOTION CLUTCH STRUCTURE
Filed May 2, 1966
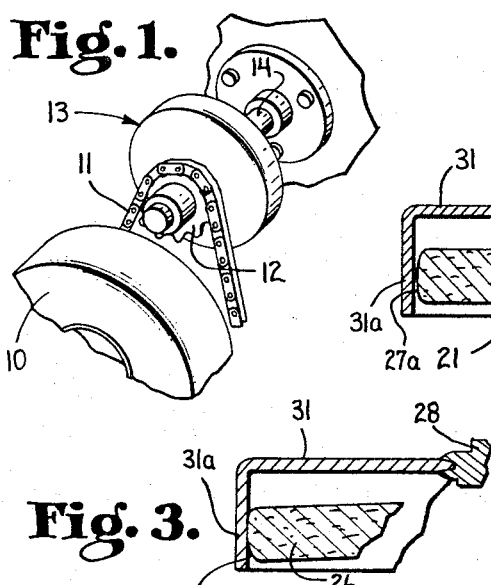
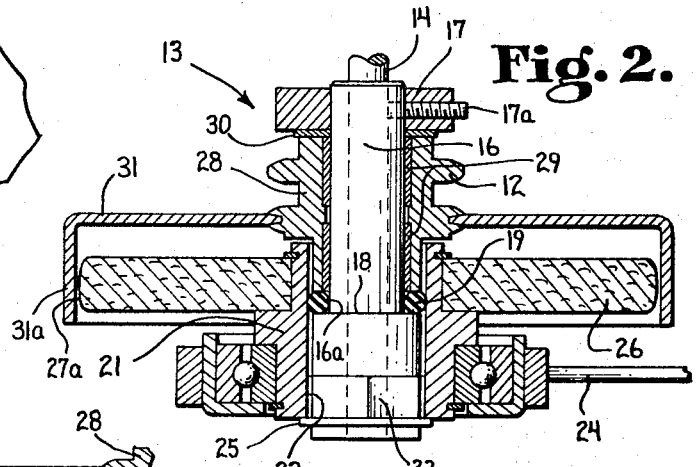
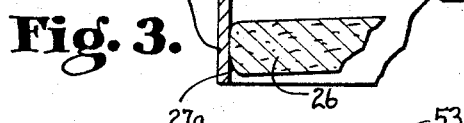
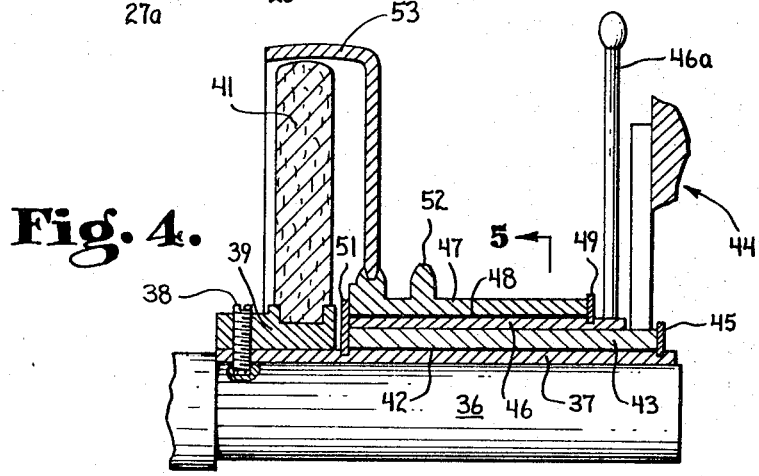
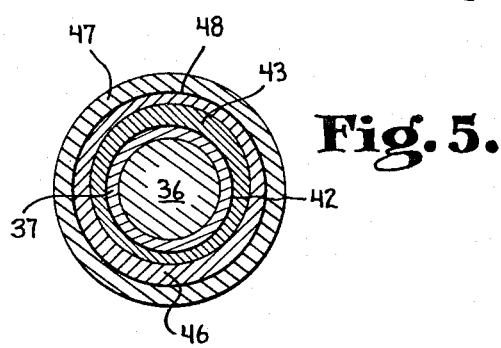
INVENTOR.
MARION H. DAVIS
BY
Woodard, Weikart, Emhardt & Naughton
Attorneys

United States Patent Office 3,414,099
Patented Dec. 3, 1968

3,414,099
TILT MOTION CLUTCH STRUCTURE
Marion H. Davis, Hagerstown, Ind., assignor to V-Plex Clutch Corp., Hagerstown, Ind., a corporation of Delaware
Filed May 2, 1966, Ser. No. 552,369
6 Claims. (Cl. 192—65)

ABSTRACT OF THE DISCLOSURE

A clutch assembly in which frictional engagement of the driving and driven members is achieved by tilting or shifting the driven member with relation to the driving member, the movement of the displaced member being generally transverse to the axis of rotation of the driving member.

---

This invention relates generally to clutch assemblies or torque transfer couplings and in particular to clutch assemblies adapted for the transfer of power in light machinery such as the self-propelled power lawn mowers.

In applications such as self-propelled power lawn mowers, the clutch for engaging and disengaging the engine crankshaft with the mower wheels must transfer the power smoothly, without excessively stressing the relatively small power take-off shaft of the engine. Engagement and disengagement must be accomplished with a light pull and short motion and the assembly must be relatively simple and trouble-free.

It is an object of the present invention to provide a clutch assembly which has improved torque transfer capacity.

It is a further object of the present invention to provide a clutch assembly which requires a minimum force to engage and which does not apply an objectionable bending moment to the engine power take-off shaft.

These and other objects will become apparent as the description proceeds with reference to the accompanying drawings in which:

FIG. 1 is a fragmentary perspective view showing the environment in which the clutch assembly of the present invention is normally utilized.

FIG. 2 is a cross-sectional view of a clutch assembly embodying the present invention.

FIG. 3 is a fragmentary view of a portion of the structure shown in FIG. 2 but illustrating the pertinent components when the clutch is engaged.

FIG. 4 is a fragmentary, side sectional view of a modified form of the present invention.

FIG. 5 is a sectional view taken generally along the line 5—5 of FIG. 4.

Referring initially to FIG. 1, there is shown a portion of a structure on which the clutch of the present invention may be utilized and includes the tired wheel 10 which is driven through the chain 11 moved by the sprocket 12 which is formed on the clutch assembly shown generally at 13. The engine power take-off shaft is shown at 14.

Referring now to FIG. 2, the clutch assembly 13 will be described in detail. The clutch assembly includes a drive means which may take the form of a tube 16 closely fitting the drive shaft 14. The shaft 14 and the tube 16 are rotationally locked together by the set screw 17a which is threaded through the collar 17 and the tube 16. The shaft is formed so as to provide a shoulder 18 and adjacent this shoulder is located a resiliently deformable annulus 19 which may take the form of an oil-resistant rubber or other suitable elastomeric O-ring indicated at 19. The tube 16 thus forms a cylindrical surface 16a which is encircled by the O-ring 19.

A drive sleeve 21 encircles the tube 16 and is rotationally locked thereto by means of the hexagonal head 22 on the tube 16 which mates loosely with the hexagonal socket 23 formed in the drive sleeve 21. It will be understood that any other loosely fit splining arrangement could be used in place of the hexagon head and socket here described. A snap ring 25 retains the sleeve. The sleeve 21 carries a ball bearing to the outer portion of which is attached a member 24 which is adapted for rectilinear movement and serves as an operating rod for engaging and disengaging the clutch as will subsequently be described.

Rigidly mounted on the drive sleeve 21 is a traction wheel 26, formed of suitable frictional material, the traction wheel having a slightly crowned peripheral surface 27a. The fit of the drive sleeve 21 on the tube 16 has sufficient clearance to allow for misalignment but the sleeve 21 is held concentric with the tube by the O-ring 19.

A driven member taking the form of a driven sleeve 28 encircles the tube 16 and bronze bushings 29 support the sleeve 28 so that the sleeve may rotate coaxially with the drive shaft 14 but independently of the drive shaft and the tube 16. One end of the sleeve 28 backs against the non-metallic thrust washer 30. The opposite end of the sleeve 28 terminates short of the shoulder 18 on the tube 16 and serves to retain the O-ring 19 in place on the tube. The driven sleeve 28 carries a cup-shaped drum 31 which extends radially outwardly from the sleeve 28, the sidewall 31a of the drum encircling in closely spaced relation the peripheral portion 27a of the traction wheel 26.

In operation, with the components of the clutch in their positions shown in FIG. 2, the rotational axis of the traction wheel 26 coincides with the rotational axis of the drive shaft 14 and the traction wheel is not in engagement with the drum 31. There is, thus, no torque transfer between the drive shaft and the driven sleeve 28. To engage the clutch, a force is exerted on the operating rod 24, through any suitable lever means, so as to cant or tilt the drive sleeve 21 with relation to the tube 16 and the drive shaft 14. The rotational axis of the traction wheel 26 is thus canted somewhat and the peripheral area 27a of the wheel 26 will engage the adjacent inner surface of the sidewall 31a of the drum 31. The point at which the canting force (applied by operating rod 24) is applied along the axis of shaft 14 is much closer to the spline area (formed by hexagon head 22 and socket 23) than to the opposite end of sleeve 21 (carrying wheel 26), so that, while the hexagon head or spline 22 is only slightly tilted with relation to the socket 23, the opposite end of sleeve 21 is eccentric or canted with relation to the axis of shaft 14. This engagement of the curved surface 27a of the wheel with inner surface of the cylindrically shaped sidewall 31a is, theoretically, a point contact, however, the area of engagement is enlarged or expanded because of the somewhat resilient characteristic of the material of wheel 26 which is flattened or resiliently deformed somewhat adjacent the "point" of contact. The frictional characteristic of the wheel 26 is such that its rotation is then imparted to the drum 31 and consequently to the driven sleeve 28. This canting of the sleeve 21 with relation to the tube 16 resiliently deforms the O-ring 19 somewhat, however, when the force acting on the operating rod 24 to engage the clutch is released the restoring force generated in the O-ring is such as to return the sleeve 21 to its concentric position shown in FIG. 2. The O-ring thus acts as a means for returning the clutch to disengaged position when the engaging force is released.

Referring now to FIGS. 4 and 5, a modified form of the clutch assembly is shown in which the shifting of the rotational axis of one of the elements to engage the clutch is accomplished by parallel displacement of the element axis, rather than canting or tilting of the axis to engage the clutch. In FIG. 4 the engine power take-off shaft is indicated at 36. Fitted to the shaft is a sleeve 37 which is concentric with the shaft and is rigidly attached thereto by the set screw 38 which is also threaded through a collar portion of a member 39 which carries the traction wheel 41. The traction wheel 41 is formed of a suitable friction material similar to the wheel 26 of FIG. 2. A bronze bushing 42 encircles the sleeve 37 and encircling the bushing is a stationary, eccentric sleeve 43, the sleeve 43 having a member extending therefrom and anchored to a stationary portion of the frame of the structure utilizing the clutch, such stationary anchoring of the eccentric sleeve 43 being indicated schematically at 44. The eccentricity, that is, the varying wall thickness of the sleeve 43 will be evident from FIG. 5. Encircling the sleeve 43 is a second eccentric sleeve 46 which has extending therefrom an operating rod 46a to permit rotation of the sleeve 46 with relation to the stationary sleeve 43. A driven sleeve 47 encircles the sleeve 46 and interposed between these two sleeves is a bushing 48. A snap ring 49, carried by the sleeve 46, a ring 51 carried by the sleeve 37 and a snap ring 45 also carried by sleeve 37 serve to hold the assembly in longitudinally proper relationship.

The driven sleeve 47 carries the sprocket, one tooth 52 of which is shown in FIG. 4. It will be understood that the sprocket exemplified by the tooth 52 is similar in configuration and function to the sprocket 12 of the structure of FIG. 2. The sleeve 47 carries a cup-shaped drum 53 which has a curved sidewall, presenting a concave surface to the curved, peripheral surface of the traction wheel 41, and extends in overlying relationship to the peripheral portion of the traction wheel.

In operation, with the parts in their position shown in FIG. 4 the drum 53 will not be engaged with the adjacent surface of the traction wheel 41 and the clutch is disengaged. To engage the clutch the lever 46a is moved angularly so as to rotate the thick portion of the sleeve 46 into overlying relationship with the thickened portion of the sleeve 43. This displaces or shifts radially the rotational axis of the driven sleeve 47 with relation to the axis of rotation of the sleeve 37 and the drive shaft 36. This causes an arcuate engagement of the traction wheel with the adjacent drum surface and torque is transferred from the traction wheel to the driven sleeve 47 and hence to the sprocket exemplified by the tooth 52. The clutch may be released by rotating the sleeve 46 back to its position of FIGS. 4 and 5 thereby returning the drive sleeve to a position in which it is out of engagement with the traction wheel 41.

From the foregoing it will be evident that the concept of the present invention provides a clutch assembly having highly desirable characteristics for the type of application described. Particularly in the case of the structure of FIGS. 1–3, that is, the type in which the axis of rotation of one of the members is tilted or canted, the area of contact of the traction wheel and the cooperating drum surface migrates around the drum surface as rotation continues thus giving an improved scrubbing action between the wheel and the drum providing added torque transfer capacity. This movement of the arc of engagement between the traction wheel and the drum, moving both circumferentially and laterally, acts as a pump to induce the flow of cooling air into and out of the interior of the drum.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. A clutch assembly for controlling the transfer of rotation of a drive shaft to a driven member, said assembly comprising drive means rotationally locked to the drive shaft and providing a cylindrical exterior surface parallel to the drive shaft axis of rotation, a drive sleeve encircling said cylindrical surface with substantial clearance therebetween, a resiliently deformable annulus positioned between said cylindrical surface and the adjacent inner surface of the drive sleeve for maintaining said drive sleeve concentric with said cylindrical surface, a traction wheel having a circular periphery and mounted on and extending radially outwardly from said drive sleeve, a driven member mounted for rotation coaxially with said drive shaft, a drum carried by said driven member and extending radially outwardly thereof, said drum having a surface spaced slightly from but clearing adjacent surfaces of said traction wheel when said drive sleeve is concentric with said cylindrical surface, and means carried by said drive sleeve spaced axially along the drive sleeve from both said deformable annulus and said traction wheel for application to said drive sleeve of a force transverse to the axis of rotation of the drive shaft to thereby resiliently deform said annulus and cant the rotational axis of said tranction wheel with relation to the rotational axis of the drive shaft so as to cause contact of the adjacent traction wheel and drum surfaces and thus transfer rotation of the wheel to the drum, the restoring force in said resiliently deformable annulus recentering said drive sleeve and disengaging said wheel and drum when said transverse force is removed from said drive sleeve.

2. A clutch assembly as claimed in claim 1 in which said drive means takes the form of a tube closely fitting the drive shaft.

3. A clutch assembly as claimed in claim 1 in which said resiliently deformable annulus is an O-ring formed of a suitable elastomer.

4. A clutch assembly as claimed in claim 1 in which the peripheral surface of said traction wheel has a slight crown or transverse arcuate configuration and said drum is generally cup-shaped with the inner surface of the side wall of the drum and the crowned peripheral surface of said wheel providing the contacting surfaces upon canting of the rotational axis of said traction wheel.

5. A clutch assembly as claimed in claim 1 in which said driven member takes the form of a sleeve encircling but capable of rotating freely on said drive shaft.

6. A clutch assembly as claimed in claim 5 in which the end surface of said driven member forming sleeve serves as a retainer of said resiliently deformable annulus.

References Cited

UNITED STATES PATENTS

| | | | |
|---|---|---|---|
| 923,613 | 6/1909 | Atwood | 192—52 |
| 1,492,536 | 4/1924 | Renner | 192—52 |
| 1,803,776 | 5/1931 | Seitz | 192—30 |

BENJAMIN W. WYCHE III, *Primary Examiner.*

L. J. PAYNE, *Assistant Examiner.*